United States Patent [19]
Townsend

[11] Patent Number: 5,476,068
[45] Date of Patent: Dec. 19, 1995

[54] APPARATUS AND METHOD FOR PRODUCING AN AQUARIUM DISPLAY

[76] Inventor: Richard Townsend, 1717 12th Ave., Lot J-6, Lake Worth, Fla. 33460

[21] Appl. No.: 302,164

[22] Filed: Sep. 8, 1994

[51] Int. Cl.⁶ ................................................. A01K 63/00
[52] U.S. Cl. ............................................. 119/256; 40/406
[58] Field of Search ............................. 119/253, 256, 119/249, 254; 40/406, 407, 409, 410

[56] References Cited

U.S. PATENT DOCUMENTS

| | | | |
|---|---|---|---|
| 3,057,094 | 10/1962 | Winkelman | 119/256 |
| 3,390,665 | 7/1968 | Wininger | 119/256 |
| 4,160,427 | 7/1979 | Holbrook | 119/256 |
| 5,098,111 | 3/1992 | Kashimoto. | |

Primary Examiner—Gene Mancene
Assistant Examiner—Thomas Price
Attorney, Agent, or Firm—Malin, Haley, DiMaggio & Crosby

[57] ABSTRACT

An aquarium action display having a decorative display structure submerged beneath the surface of an aquarium and seated on the aquarium floor. The display structure incorporates a catch basin for collecting granular display media and funneling the media to a tube having a notch interfaced with the catch basin. An aquarium pump produces a flow of water through the tube whereby the granular display media is mixed with the water flowing through the tube and discharged at an outlet and collected by the catch basin thereby creating an underwater display.

10 Claims, 3 Drawing Sheets

APPARATUS AND METHOD FOR PRODUCING AN AQUARIUM DISPLAY

BACKGROUND OF THE INVENTION

1. Field of the Invention

This invention relates generally to devices displayed in aquariums. More specifically, this invention relates to submerged aquarium action displays.

2. Description of the Prior Art

In recent years, aquarium displays have become increasingly popular. Efforts to enhance the visual appeal of aquariums have resulted in numerous decorative accessories. Among these accessories are various types of sand and gravel fill for lining the aquarium bottom, decorative rock-like formations and countless static and dynamic underwater displays. It has been found that the movement associated with dynamic displays greatly enhances an aquariums visual appearance.

An example of such a device is U.S. Pat. No. 3,057,094, issued to Winkelman, disclosing a submerged waterfall display for aquariums consisting of a structure using air bubbles, produced by a conventional source and injected at the base of an upwardly extending tube, to induce a flow of water and sand into the base of the tube. The upward flow of air bubbles causes the sand, air, and water mixture to rise to the top of the tube where the mixture is then discharged thereby allowing the air bubbles to escape, and the sand to fall back to a catch basin while visible to aquarium observers thus giving the impression of a submerged waterfall. The device, however, requires a bulky domed air cap and an air escape tube that produces a constant stream of air bubbles noticeably escaping the device while returning to the atmosphere.

Similarly, U.S. Pat. No. 3,390,665, issued to Wininger, discloses an aquarium waterfall utilizing, in a like manner, an air source to produce air bubbles which are injected into the lower portion of a vertical tube such that the rising air bubbles induce water and sand to be drawn into the base of the tube and rise to a discharge location. While Wininger eliminates the visible stream of air bubbles escaping beneath the surface of the water, the invention contemplates discharging the bubbles directly at the water surface where they are likely to produce a continuous noise that is not particularly desirable.

U.S. Pat. No. 4,160,427, issued to Holbrook, discloses an aquarium waterfall again using an air source which injects air bubbles at the base of a lift tube such that the rising air bubbles induce water and sand to be drawn into the base of the tube and rise to a discharge location. Holbrook teaches a waterfall simulated by a directed flow of water and sand downward over a simulated cliff having several outcroppings.

While the aforementioned devices have achieved some success in simulating submerged aquarium waterfalls, the prior art devices all possess limitations. For example, all of the devices utilize a compressed air source to inject air into a vertical tube to achieve the lifting effect. As a result, all of the referenced art possess a similar functional limitation in that the air introduced below the water level must be provided with a return path to the ambient atmosphere. In all of the referenced prior art, this method results in the release of air bubbles below the surface of the water. In the Winkelman and Holbrook inventions, this further results in a continuous and visible stream of air bubbles escaping to the surface. While the Wininger invention attempts to conceal the escaping air bubbles from view, the bubbles still produce unwanted noise when breaking the surface of the water.

In addition, the use of rising air bubbles to induce water flow effectively limits the capacity of the system as this method is not capable of producing large water flows. This flow limitation limits the size and quantity of sand particles that can be lifted vertically against gravity. The resulting flow of fine sand is thus relatively small, thereby further limiting the visual effect.

Furthermore, the air utilized by the prior art dictates the use of structures designed to conceal the escaping bubbles. Consequently, the prior art is limited to simulating waterfall like effects with a discharge point either concealed or located sufficiently close to the surface so as to minimize the undesirable visual appearance of rising air bubbles. The foregoing limitation prevents the prior art from effectively simulating an underwater fountain, with a visible discharge point or open fountain head. The instant invention overcomes the this limitation by using pressurized water, in lieu of compressed air, thereby eliminating any undesirable visual appearance resulting from rising air bubbles. As a result, a number of underwater displays, such as fountains and volcanoes, can now be attractively simulated using the instant invention.

Therefore, it is believed that greater visual effect can be achieved by a submerged aquarium display that overcomes the limitations of the prior art by producing larger water flows capable of vertically transporting greater quantities of sand, or larger more visible material such as gravel, without producing distracting air bubbles as a by product.

SUMMARY OF THE INVENTION

The present invention contemplates an improved submerged aquarium display capable of producing sufficient water flow so as to vertically transport large amounts of sand, or preferably larger and heavier material such as aquarium gravel, against gravity without the use of compressed air. The aquarium display essentially comprises: a decorative display structure, a gravel supply tube having a water/gravel mixing port, a water supply hose, a submersible pump, a gravel catch basin, and aquarium gravel.

In the preferred embodiment of the present invention, a decorative display structure is submerged beneath the surface of an aquarium and seated on the aquarium floor. While the display structure may comprise one of any number of decorative shapes, all incorporate a gravel catch basin for accumulating the gravel used in the display. The display structure houses a generally L-shaped gravel supply tube having a vertical component terminating at an outlet, and a horizontal component terminating at an inlet. The gravel supply tube incorporates a gravel/water mixing port interfaced to said gravel catch basin. The gravel catch basin is initially filled with a sufficient amount of gravel for use with the display.

A conventional aquarium pump is connected to the gravel supply tube inlet and configured to supply a constant stream of pressurized aquarium water to said inlet. The flow of water in the gravel supply tube draws gravel from the catch basin through the gravel/water mixing port and carries the gravel to the outlet such that the gravel is discharged from the display in a fountain like manner. Once discharged, the gravel follows a path dictated by the discharge angle, velocity, and gravity. The gravel catch basin is positioned relative to the discharge point so as to accumulate the discharged gravel for recirculation.

In accordance with the present invention, it is an object hereof to provide a novel and dramatic aquarium display device.

An additional object of the instant invention is to provide a realistic aquarium display device capable of flows greater than those produced by the prior art.

Another object of the instant invention is to provide an aquarium display device without the use of compressed air or air bubbles.

Still another object of the instant invention is to provide an aquarium display device using aquarium gravel.

A further object of the instant invention is to provide a realistic, reliable, and inexpensive dynamic gravel display device with no moving parts.

In accordance with these and other objects which will be apparent hereinafter, the instant invention will now become described with particular reference to the accompanying drawings.

DESCRIPTION OF THE PREFERRED EMBODIMENTS

Figure 1:
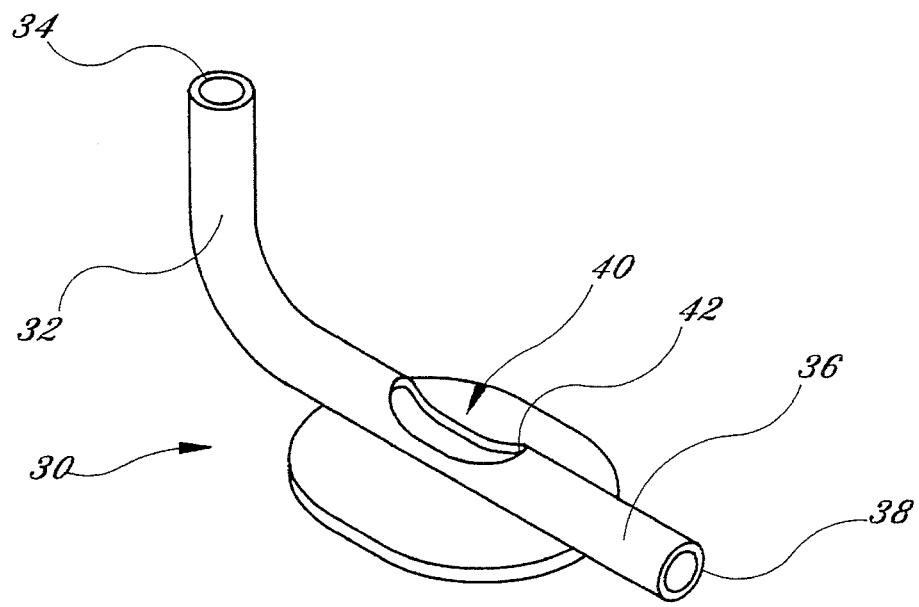
FIG. 1 is a perspective view of the gravel supply tube.
Figure 2:
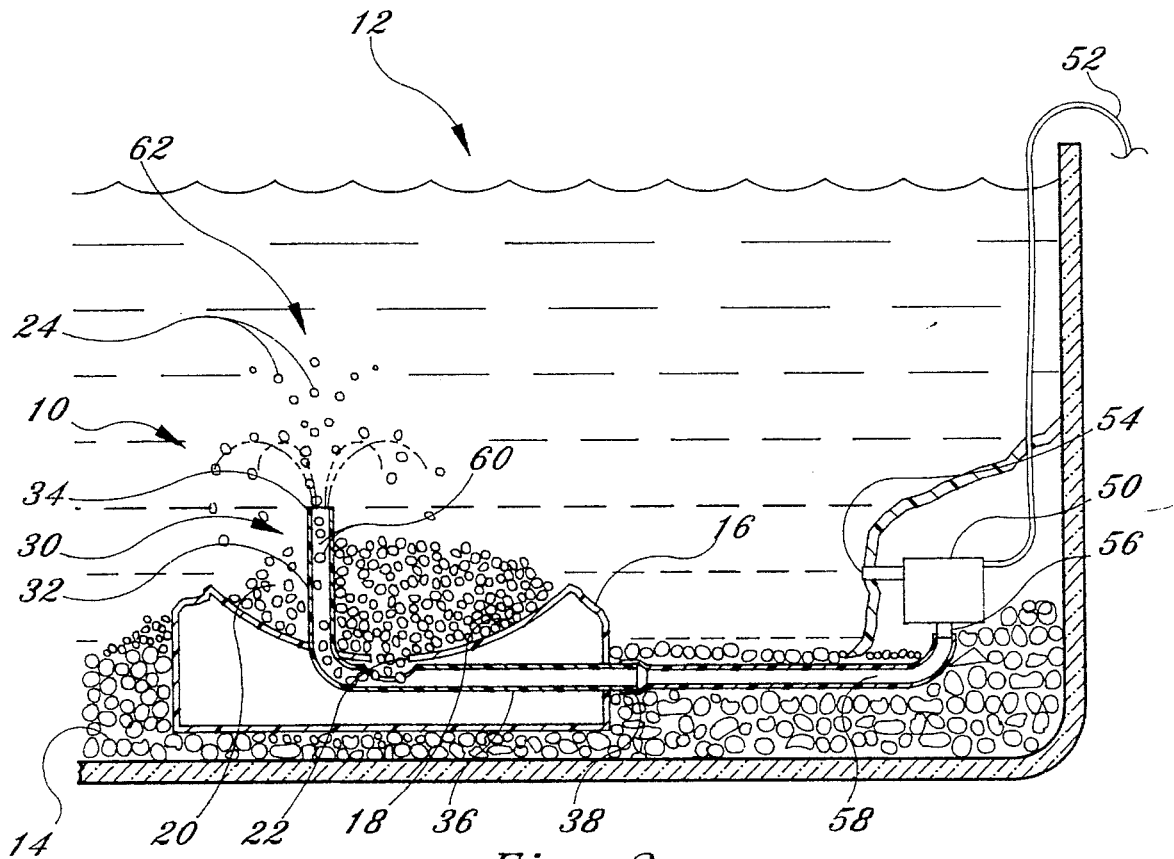
FIG. 2 is a sectional view of the aquarium display device embodied in a conventional fountain.

Turning first to FIG. 2, the aquarium display device of this invention generally designated with reference numeral 10 is shown mounted in a water filled aquarium 12, seated on the gravel bed 14 and completely submerged in the aquarium water. The display device is composed of a decorative structure 16 which incorporates a catch basin 18 for accumulating gravel display media 20, and a gravel supply tube 30. As best seen in FIG. 1, L-shaped tube 30 has an aperture 42 forming a mixing port 40. Gravel catch basin 18 further incorporates a gravel supply port 22. The catch basin 18 functions to accumulate discharged gravel 24 and funnel said accumulated gravel 20 toward said supply port 22 for supplying gravel to said tube mixing port 40 for reasons that will soon become apparent.

Figure 3:
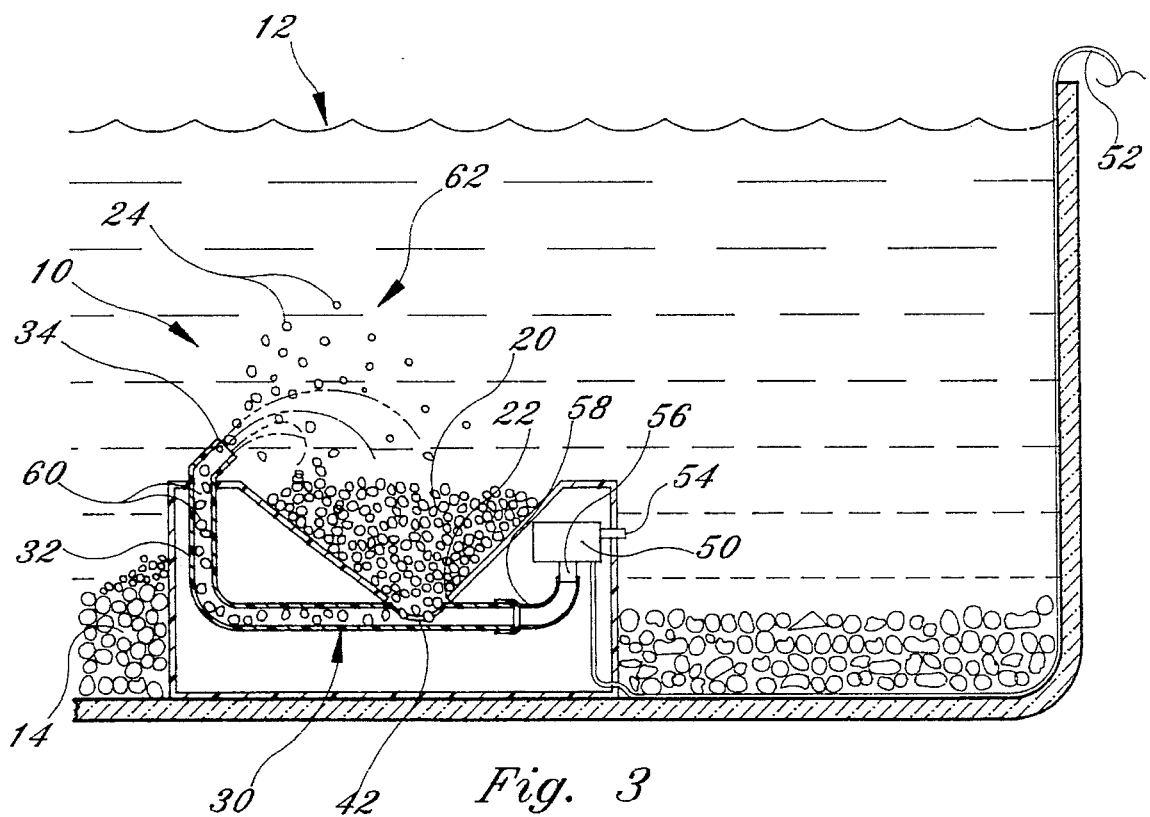
FIG. 3 is a sectional view of the aquarium display device in an alternate embodiment.
Figure 4:
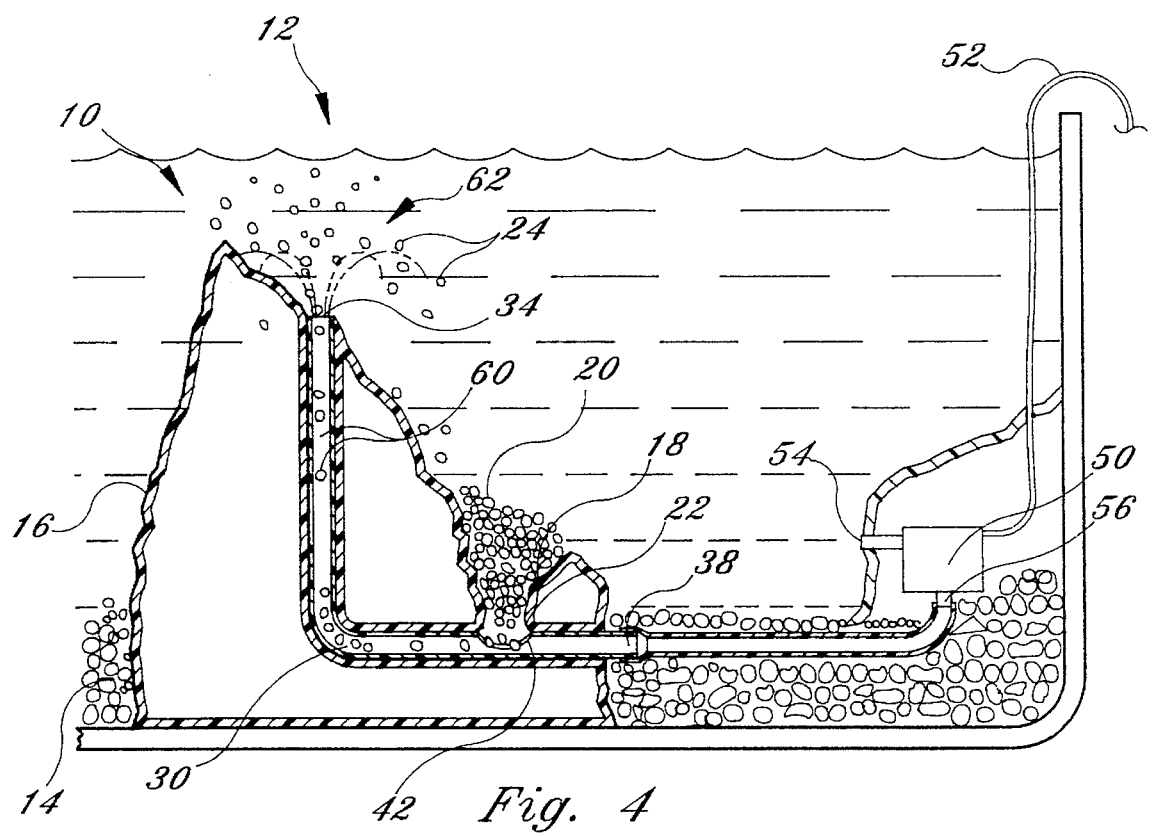
FIG. 4 is a sectional view of the aquarium display device in an embodiment simulating an underwater volcano.
Figure 5:
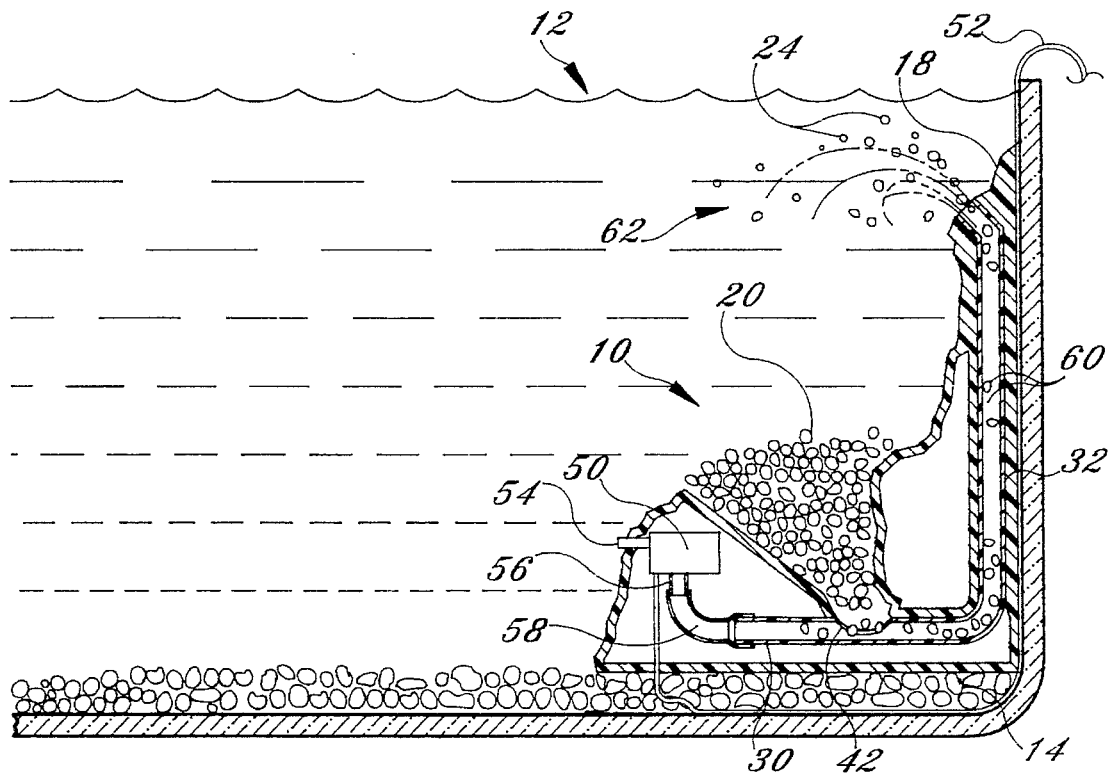
FIG. 5 is a sectional view of the aquarium display device in an alternate embodiment simulating an underwater water fall.
Figure 6:
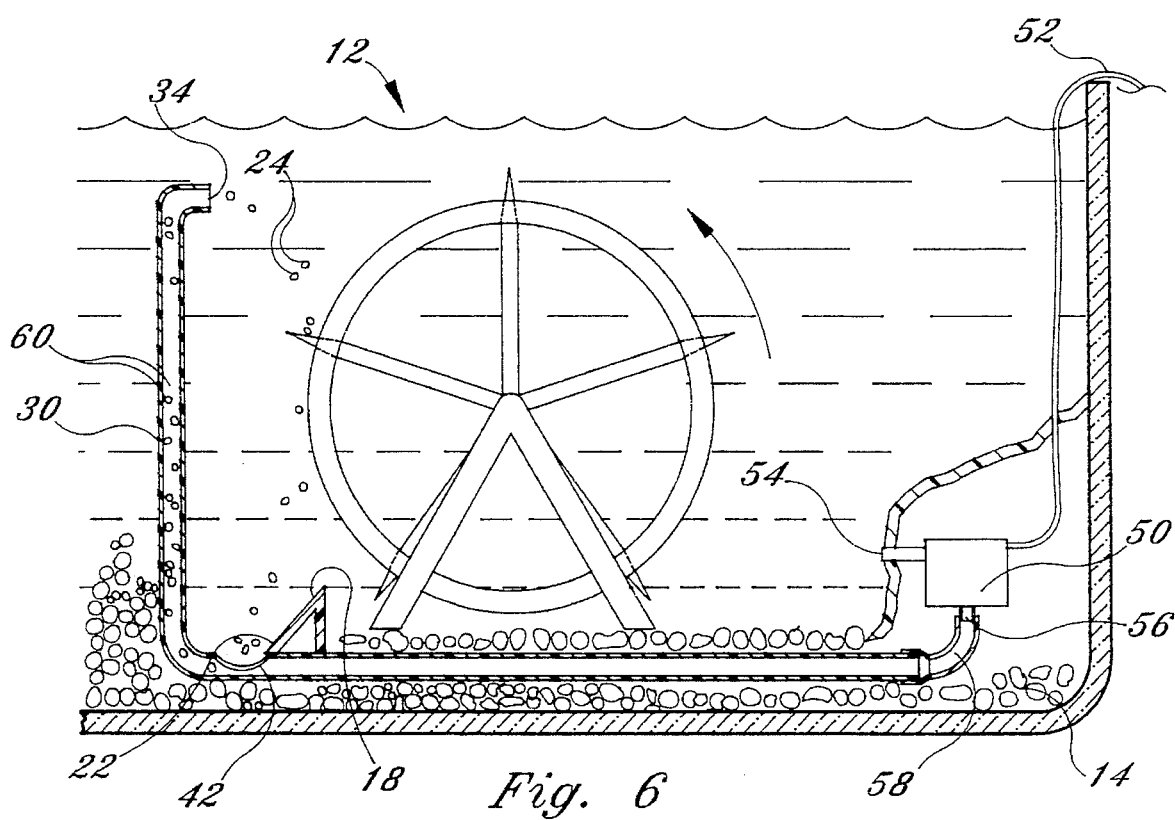
FIG. 6 is a sectional view of the aquarium display device in an alternate embodiment simulating an underwater ferris wheel.

Decorative display structure 16 and catch basin 18 may be molded of styrene or other inexpensive plastic or ceramic materials. Typically, rock-like structures may be fabricated by pouring a poly-resin into a mold that has been fashioned from a clay model. After the resin has set, or hardened, it is removed from the mold and fitted with tube 30. The decorative display structure 16 may be formed to simulate a waterfall rock formation, fountain, volcano, sea creature, ferris wheel, or any other desirable shape as depicted in FIGS. 2–6. Likewise, catch basin 18 may be formed as a natural rock formation, or any shape capable of accumulating the discharged gravel. In addition, the catch basin 18 may be formed as an integral part of the display structure as depicted in FIGS. 2–5, or the catch basin 18 may exist as a separate or remote component as depicted in FIG. 6. In addition, as seen in FIG. 4, any given display structure may incorporate more than one gravel catch basin 18.

As seen in FIGS. 2–6, the display structure 16 houses an L-shaped gravel supply tube, generally designated 30. Turning now to FIG. 1, the gravel supply tube 30 comprises a vertical component 32 terminating at a discharge outlet 34, and a horizontal component 36 terminating at an inlet 38. Tube 30 is preferably fabricated from glass because sand or gravel display media has been found to scratch plastic tubing thereby retarding performance over time due to increased friction.

While the Figure depicts a tube of uniform diameter, the invention also contemplates varying the supply tube diameter so as to increase or decrease flow velocity within the tube for optimizing the water flow rate for use with different size gravel display material. The instant invention further contemplates varying the supply tube discharge outlet 34 diameter or shape for altering the gravel discharge pattern. The gravel supply tube 30 further incorporates a gravel/water mixing port 40 interfaced with gravel supply port 22 existing on said gravel catch basin 18 as seen in FIGS. 2–6.

Turning again to FIG. 1, the gravel/water mixing port 40 comprises an aperture 42 existing on said supply tube 30 between said inlet 34 and said outlet 38. As depicted in FIG. 1, the mixing port aperture 42 in a preferred embodiment comprises a semicircular cutout or notch in the supply tube. The interface between mixing port aperture 42 and catch basin supply port 22 is completed by using a sealant to provide a watertight seal.

The instant invention further comprises a submersible aquarium pump 50 completely submerged beneath the surface of the aquarium water, and electrically connected to a power source 52 in a conventional manner. The pump 50 has a pump inlet 54 and a pump outlet 56. The pump outlet 56 is connected to gravel supply tube inlet 38 by a water supply hose 58 such that pump 50 supplies pressurized water to inlet 38. Pump 50 is preferably housed within the display structure.

Operation is initiated by placing gravel 20 in gravel catch basin 18. When pump 50 is activated, aquarium water enters the pump inlet 54, exits the pump outlet 56, and travels through water supply hose 58 to the gravel supply tube inlet 38. Water flow passing the water/gravel mixing port 40 draws display gravel 20 from gravel catch basin 18 through basin gravel supply port 22 such that the fluid flow downstream of mixing port 40 comprises a mixture of water and gravel 60. The water and gravel mixture 60 exits gravel supply tube 30 at outlet 34 and follows a path dictated by the outlet velocity and discharge angle. The path followed by the discharged gravel 24 upon exiting supply tube 30 at outlet 34 results in the formation of a fountain like display, generally designated as 62.

A number of variables effect the performance of the instant invention, including: display gravel (or sand) size, the diameter of the gravel supply tube 30, mixing port notch size, water flow rate, and the height that the display material must be transported. It has been found for example, that a small 9-inch volcano, as depicted in FIG. 4, works best using a ⅜-inch outside diameter glass tube, 0.20–0.30 silica sand, a water flow rate of 75 gallons per hour, and a mixing port notch approximately ¾-inch long by ⅜-inch wide.

In addition, the present invention contemplates a wide variety of discharge angles depending upon the particular decorative structure 16 used and desired gravel trajectory. For example, display gravel 24 may be discharged directly upward as seen in FIG. 2, or at an angle as depicted in FIG. 3.

This method of producing underwater action displays possesses several advantages over the prior art. First, since the instant invention utilizes a pumping means to produce a water flow rate sufficient to vertically lift gravel display media 24, no distracting air bubbles are produced exiting the display. Second, the use of a pumping means in lieu of the air bubbles used in the prior art, enables the instant invention to accommodate larger, more dense, display material as a result of the greater water flow rates produced. Third, the water flow rates produced by the instant invention allow for greater gravel discharge velocities resulting in more dramatic displays.

The instant invention has been shown and described herein in what is considered to be the most practical and preferred embodiment. It is recognized, however, that departures may be made therefrom within the scope of the invention and that obvious modifications will occur to a person skilled in the art.

I claim:

1. A decorative display device for use in a water filled aquarium comprising:
   (a) a supply of granular display material;
   (b) a structure submerged beneath said aquarium water surface and supported by said aquarium floor;
   (c) said structure housing a supply tube having an inlet end and an outlet end and at least one mixing means existing on said tube between said inlet end and said outlet end;
   (d) pumping means for producing a flow of aquarium water;
   (e) a hose hydraulically connecting said pumping means to said supply tube inlet, and;
   (f) means for collecting said granular display material and feeding said material to said mixing means whereby said material is mixed with said flow of aquarium water.

2. The display device of claim 1 wherein, said means for collecting said display material comprises a catch basin.

3. The display device of claim 1 wherein, said mixing means comprises a notch.

4. The display device of claim 1, wherein said pumping means comprises a submersible pump.

5. The display device of claim 1, wherein said granular display material is gravel.

6. The display device of claim 1, wherein said granular display material is sand.

7. The display device of claim 1, wherein said mixing means comprises an aperture existing on said supply tube whereby the combination of water flowing through said supply tube and gravity induce accumulated gravel to mix with said water flowing through said supply tube such that said water flow downstream of said mixing port consists of water and gravel.

8. A decorative display device for use in a water filled aquarium comprising:
   (a) gravel display material;
   (b) a structure completely submerged below the water surface of said aquarium and supported by the aquarium floor;
   (c) said structure housing an L-shaped supply tube having an inlet and an outlet and at least one mixing port existing between said inlet and said outlet;
   (d) pumping means connected to said tube inlet for pumping a flow of water through said tubular member such that said flow enters said tube at said inlet and exits said tube at said outlet;
   (e) a gravel accumulator for collecting display gravel;
   (f) said accumulator having generally tapered sidewalls defining a large top opening and a small bottom opening;
   (g) said accumulator positioned relative to said tube discharge outlet such that free falling discharged gravel enters said accumulator top opening;
   (h) said tube mixing port positioned below said accumulator bottom opening such that accumulated gravel exiting said accumulator through said bottom opening enters said mixing port whereby said gravel is mixed with said water flowing through said tube such that said gravel and water mixture is discharged from said tube in a fountain like manner.

9. A method of producing a submerged aquarium action display, which comprises:
   submerging a display structure having a reservoir in an aquarium;
   filling the reservoir with granular display material;
   drawings aquarium water into a water pump inlet and raising the pressure of said water;
   pumping said pressurized aquarium water through a tube housed within the display structure;
   mixing the aquarium water flowing through the tube with the display material from the reservoir;
   discharging the water and display material mixture from the display structure;
   collecting the discharged display material in the reservoir for recirculation.

10. A decorative display device for use in a water filled aquarium comprising:
   (a) a supply of granular display material;
   (b) a structure submerged beneath said aquarium water surface;
   (c) said structure housing a supply tube having an inlet end and an outlet end;
   (d) means for pumping aquarium water thereby creating water flow;
   (e) hose hydraulically connecting said pumping means to said supply tube inlet whereby pumped water flows through said supply tube;
   (f) means for mixing said granular display material with said flow of water traveling through said supply tube, said means for mixing including an aperture existing on said supply tube, whereby the combination of water flowing through said supply tube and gravity induce accumulated gravel to mix with said water flowing through said supply tube such that said water flow downstream of said mixing port consists of water and gravel whereby a mixture of water and display material is discharged from said tube outlet end; and
   (g) means for collecting said discharged display material for recirculation, said means for collecting having an outlet connected to said means for mixing for feeding said display material to said supply tube.

* * * * *